United States Patent
Faccin

(10) Patent No.: US 8,019,344 B2
(45) Date of Patent: Sep. 13, 2011

(54) APPARATUS, AND ASSOCIATED METHODS, FOR FACILITATING SECURE, MAKE-BEFORE-BREAK HAND-OFF IN A RADIO COMMUNICATION SYSTEM

(75) Inventor: Stefano Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/202,412

(22) Filed: Aug. 11, 2005

(65) Prior Publication Data

US 2006/0121883 A1 Jun. 8, 2006

Related U.S. Application Data

(60) Provisional application No. 60/600,617, filed on Aug. 11, 2004.

(51) Int. Cl.
*H04W 36/00* (2009.01)
*H04M 1/66* (2006.01)
*H04M 1/68* (2006.01)
*H04M 3/16* (2006.01)
*H04W 4/00* (2009.01)
*H04K 1/00* (2006.01)

(52) U.S. Cl. ........ 455/437; 455/436; 455/439; 455/410; 370/331; 370/328; 370/338; 380/247

(58) Field of Classification Search .................. 455/438, 455/439, 437, 442, 436, 410; 380/247, 248; 370/328, 331, 338
See application file for complete search history.

(56) References Cited

U.S. PATENT DOCUMENTS

| | | | |
|---|---|---|---|
| 5,101,501 A * | 3/1992 | Gilhousen et al. | 455/442 |
| 6,370,380 B1 * | 4/2002 | Norefors et al. | 455/436 |
| 6,587,680 B1 * | 7/2003 | Ala-Laurila et al. | 455/411 |
| 6,931,249 B2 * | 8/2005 | Fors et al. | 455/436 |
| 7,107,051 B1 * | 9/2006 | Walker | 455/432.1 |
| 2003/0108007 A1* | 6/2003 | Holcman et al. | 370/331 |
| 2004/0185853 A1* | 9/2004 | Kim et al. | 455/438 |
| 2004/0203783 A1* | 10/2004 | Wu et al. | 455/436 |
| 2004/0242228 A1* | 12/2004 | Lee et al. | 455/432.1 |
| 2005/0070288 A1* | 3/2005 | Belkin et al. | 455/439 |
| 2005/0096055 A1* | 5/2005 | Colban et al. | 455/442 |

(Continued)

FOREIGN PATENT DOCUMENTS

EP 1422875 5/2004

(Continued)

OTHER PUBLICATIONS

Wang, H., et al. "Fast Authentication for Inter-domain Handover." Telecommunications and Networking—ICT 2004.

(Continued)

*Primary Examiner* — Un C Cho
(74) *Attorney, Agent, or Firm* — AlbertDhand LLP

(57) ABSTRACT

Apparatus, and associated method, for facilitating transition, or other communication hand-off, between access points of a wireless local area network. When an old access point is notified of selection to transition communications, the old access point generates a transition request message that is communicated by way of a network to the new access point. The transition request includes a temporary key. And, the old access point notifies the mobile station of the temporary key. The mobile station re-associates with the new access point, and the temporary key is used pursuant to initial communications between the mobile station and the new access point.

20 Claims, 4 Drawing Sheets

U.S. PATENT DOCUMENTS

2005/0107081 A1* 5/2005 Kang et al. ............... 455/426.2
2005/0111666 A1* 5/2005 Blom et al. ................ 380/277
2005/0152305 A1* 7/2005 Ji et al. ..................... 370/328

FOREIGN PATENT DOCUMENTS

| EP | 1 439 667 | 7/2004 |
|---|---|---|
| WO | WO 03100990 | 12/2003 |
| WO | WO 2005/027559 | 3/2005 |

OTHER PUBLICATIONS

"IEEE Trial-Use Recommended Practice for Multi-Vendor Access Point Interoperability via an Inter-Access Point Protocol Across Distribution Systems Supporting IEEE 802.11 Operation; IEEE Std. 802.11 F-2003 ED-Anonymous." Jan. 2003.

Extended European Search Report for European Application No. EP 05 78 3086 dated Jan. 25, 2011.

* cited by examiner

APPARATUS, AND ASSOCIATED METHODS, FOR FACILITATING SECURE, MAKE-BEFORE-BREAK HAND-OFF IN A RADIO COMMUNICATION SYSTEM

CROSS-REFERENCE TO RELATED APPLICATIONS

The present application claims the priority of Provisional Patent Application Ser. No. 60/600,617, filed on 11 Aug. 2004, the contents of which are incorporated herein by reference.

The present invention relates generally to a manner by which to perform communication hand-offs between fixed-site stations to permit continued communications of a mobile station, e.g., as it travels through an area encompassed by a radio network of a radio communication system, such as a wireless local area network (WLAN). More particularly, the present invention relates to apparatus, and an associated method, by which to facilitate a secured hand-off, i.e., transition, between access points of a WLAN, or other fixed-site stations of a radio network.

A context is established by the mobile station with a target, fixed-site station, i.e., the new access point, prior to transitioning the communications to the target station. A temporary key is created between the mobile station and an active, fixed-site station, i.e., the old access point. And, the temporary key is subsequently used initially in communications between the mobile station and the target station. Overhead signaling is reduced relative to existing schemes. And, transitioned delays that might degrade or interrupt communications are also reduced due to the pre-establishment of the context prior to the transition to the new access point. Additionally, implementation is possible within the constraints of existing variants of the IEEE 802.11 requirements.

BACKGROUND OF THE INVENTION

Advancements in communication technologies have resulted in the development and deployment of improved communication systems through which to communicate to effectuate communication services.

In general, the communication service is effectuated by, or between, a set of communication stations that are operable in, and form part of, the communication system. The communication stations variously form sending stations that send communication data and receiving stations that receive communication data. The communication stations that are parties to a communication session, pursuant to which a communication service is effectuated, are interconnected by way of a communication channel. Communication data sent by a sending station is communicated upon the communication channel for delivery to a receiving station.

Some communication systems provide for two-way communications in which a single communication station is capable both of sending communication data and of receiving communication data.

When the communication channels used to communicate the communication data is formed of a radio channel, the communication system is referred to as a radio communication system. A radio communication system advantageously provides for communications even when communication stations operable therein are unable to be interconnected by way of wirelines upon which communication channels are defined in wireline communication systems. Free of the need to interconnect the communication devices with wireline connections, communication stations of a radio communication system are positionable at locations between which wireline connections are unavailable while still permitting communications to be effectuated therethrough. Additionally, free of the need to interconnect the communication stations with wireline connections, one, or more, of the communication stations between which data is communicated is permitted mobility, thereby permitting the radio communication system to be implemented as a mobile communication system.

A cellular communication system is exemplary of a mobile communication system. The network infrastructures of various types of cellular communication systems have been installed over significant portions of the populated areas of the world. And, their use by way of which to effectuate various communications services is widespread. Typically, users communicate through the use of mobile stations that are radio transceivers operable to transceive communication data with structure of the network of a cellular communication system in which the mobile station is operable. The networks of cellular communication systems include fixed-site transceiver stations, sometimes referred to as base stations, with which the mobile stations communicate by way of radio channels. As a mobile station travels through a geographical area encompassed by the network of a system, the communications with the mobile station are handed-off between successive ones of the fixed-site stations.

Other radio communication systems have been developed that include some of the characteristics of cellular communication systems. For instance, wireless local area networks (WLANs) include, typically, network infrastructures having fixed-site transceivers stations with which mobile stations communicate and between which communication hand-offs are performed as a mobile station travels through an area encompassed by such networks. The fixed-site transceivers of a wireless local area network are sometimes referred to as access points (APs). The hand-off of communications between successive access points of a wireless local area network permit continued communications, e.g., as a mobile station travels between coverage areas defined by the separate ones of the access points. A hand-off of communications is sometimes also referred to as a transition of communications.

In any communication service, and particularly in real-time services, e.g., voice services, communication delays when the communications are handed-off between fixed-site stations should be minimal. Otherwise, the interruption is noticeable, causing communication degradation or interruption. Proposals for standardization of hand-off, i.e., BSS (Base Station System) transition, in IEEE 802.11-compliant, and variants thereof, are undergoing consideration, and additional schemes are being proposed.

The procedures are generally categorized as being of either of two types, either a make-before-break (MBB) or a break-before-make (BBM) procedure.

In a make-before-break procedure, generally, upon determination of the need for a transition of communication from a first fixed-site station to a second fixed-site station, the mobile station performs a set of procedures, e.g., authentication procedures, with a target fixed-site station, i.e., a new access point (nAP) prior to transitioning communications from the active fixed-site station, i.e., the old access point (oAP) to the target station. By performing the procedures prior to transitioning to the target station, breaks in communications are minimized.

In a break-before-make scheme, upon determination of the need for a transition of communications to the target station, the mobile station transitions out of communications with the active station and connects to the target station.

Existing procedures include the use of pre-keying. However, the existing procedures that provide pre-keying generally require full four-way hand shake procedures to be performed pursuant to the hand-off of communications between fixed-site stations. The four-way hand shake procedure is time consuming and requires substantial overhead signaling. And, when pre-keying is performed with more than one target fixed-site station, the overhead signaling and time requirements further increase. Existing, alternative schemes of the break-before-make utilize post-keying procedures. But, in these procedures, significant time delays result due to the need to establish keys subsequent to the communication break.

In short, existing procedures and proposals are unduly time consuming and signaling-overhead consumptive. A scheme by which better to facilitate communication hand-offs would be advantageous.

It is in light of this background information related to communications in a radio communication system that the significant improvements of the present invention have evolved.

SUMMARY OF THE INVENTION

The present invention, accordingly, advantageously provides apparatus, and an associated method, by which to perform communication hand-offs between fixed-site stations to permit continued communication of a mobile station, e.g., as the mobile station travels in an area encompassed by the radio network of a radio communication system. The communication system forms, for instance, a WLAN (Wireless Local Area Network).

Through operation of an embodiment of the present invention, a manner is provided by which to facilitate a secure hand-off, i.e., transition of communications from an active fixed-site station to a target fixed-site station of a radio network. A context is established by the mobile station with the target fixed-site station prior to transitioning the communications to the target station.

In one aspect of the present invention, a temporary key is created between the mobile station and the active fixed-site station. The temporary key is subsequently used in initial communications between the target fixed-site station and the mobile station. The temporary key, created by the mobile station and the active fixed-site station obviates the need to perform corresponding signaling between the mobile station and the target station, or target stations pursuant to the hand-off. The overhead signaling required pursuant to the hand-off is reduced, and the corresponding time delays required pursuant to the hand-off correspondingly are reduced.

In another aspect of the present invention, indications of selection of hand-off is provided to the active fixed-site station by the mobile station. And, responsive to the delivery to the active station of the selection, i.e., detection at the active fixed-site station of a request for transition from the active station to a target fixed-site station, a temporary key, such as a temporary pair-wise transient key (T-PTK), is generated. The temporary key is generated using values maintained at the fixed-site station and also values communicated to the fixed-site station by the mobile station. The active site also operates to generate a request message that is populated with values of the temporary key, and the request message is forwarded to the target fixed-site station. The request message is of a selected format, for instance, an IEEE 802.1x message-type. By sending the request message populated with the temporary key to the target station, the target station is notified of the hand-off request and of the temporary key.

The target station returns a response to the active station. The response includes, e.g., an indication of the lifetime of the temporary key, i.e., its period of usefulness. And, the active station also sends a notification message to the mobile station of the temporary key and also, if available, of the period of usefulness of the temporary key.

Thereby, both the target station and the mobile station have the temporary key. As the active station forwards the request message containing the temporary key to the target station by way of the network infrastructure, signaling on the radio air interface is not required. And, by providing both the mobile station and the target station with the temporary keys, reassociation of the mobile station with the target station is quickly effectuated as keys do not need to be exchanged to permit the reassociation.

And once the transition of communications is completed, a four-way hand shake is performed to form a permanent key, e.g., a permanent pair-wise transient key, subsequently to be used pursuant to communication operations between the mobile station and the target station.

In one implementation, a mechanism is provided for an IEEE 802.11-compliant, or a variant thereof, communication system, such as a wireless local area network. In an 802.11-compliant system, the fixed-site stations, referred to as access points, form part of the network infrastructure of the system, and a security association is provided between the access points of the network. A mobile station determines when a transition from an old, i.e., active, access point to a new, i.e., target, access point is to be carried out. Once a determination is made, the mobile station sends a transition request to the old access point. The mobile station, in one implementation, also performs pre-authentication with the new access points. The old access point, upon detection of the request made by the mobile station, generates a temporary pair-wise transient key (T-PTK). The temporary pair-wise transient key is formed using values originated at the access point as well as values originated at the mobile station. Once the temporary key is formed, a request message is generated by the old access point and forwarded to the new access point, thereby providing the new access point with the temporary key. And, the old access point also notifies the mobile station of the temporary key. Thereby, both the mobile station and the new access point are provided with the temporary key. The mobile station then moves to the new access point using the temporary key. And, once data traffic is up between the mobile station and the new access point, a permanent key is created therebetween, subsequently to be used for subsequent communications.

The scheme, when implemented in an IEEE 802.11-compliant system is in conformity of existing requirements of the IEEE 802.11 protocols. The pair-wise transient key is not used across association and permits a make-before-break transition to be performed with reduced levels of overhead signaling on a radio air interface relative to conventional schemes. Additionally, as the amount of overhead signaling is reduced, the transition to the new access point is carried out more quickly than otherwise would be possible.

In these and other aspects, apparatus, and an associated method, is provided for facilitating hand-off of communications of a mobile station with a first fixed-site station to a second fixed-site station. A request message generator is adapted to receive and indication of a selection to hand-off communications from the first fixed-site station to the second fixed-site station. The request message generator generates a request for delivery to the second fixed-site station to request the hand-off of the communications. The request includes a temporary key generated and used pursuant to communications between the mobile station and the first fixed-site station. A response message detector is adapted to detect a response generated by the second fixed-site station responsive to the request generated by the request message generator.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
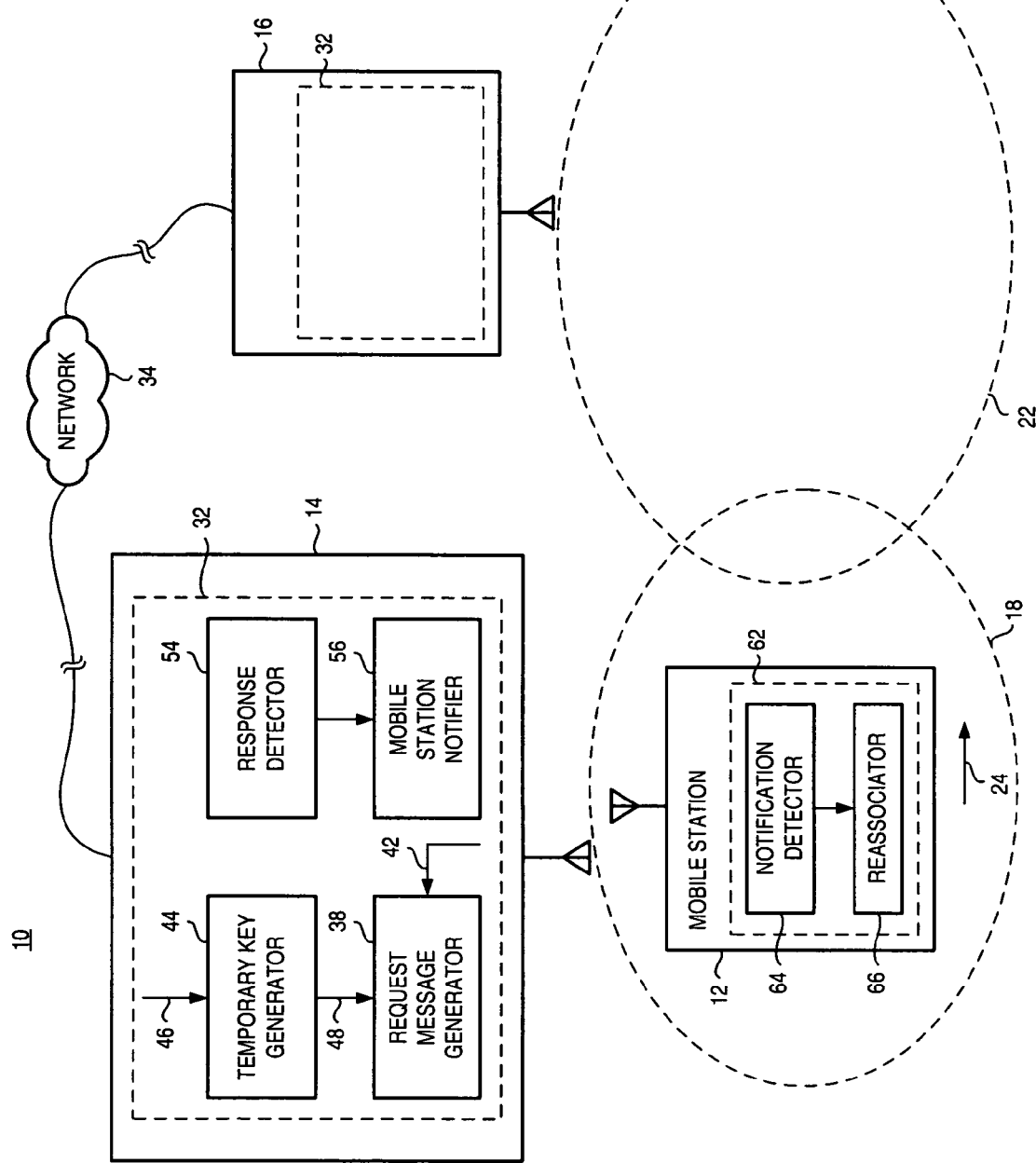
FIG. 1 illustrates a functional block diagram of an exemplary communication system in which an embodiment of the present invention is operable.

Referring first to FIG. 1, a radio communication system, shown generally at 10, provides for radio communications with mobile stations (STAs) of which the mobile station 12 is representative. In the exemplary implementation, the communication system forms a wireless local area network (WLAN) that operates pursuant to an IEEE 802.11, an IEEE 802.12, or other variant, operating protocol. While the following description shall be described with respect to its implementation in such a WLAN, it should be understood that the, in other implementations, embodiments of the present invention are variously also implementable in communication systems of other types and communication systems operable pursuant to other operating protocols.

The system includes a network part having a plurality of access points (APs). Here, to access points, access point 14 and access point 16, are shown. The access points are fixed-station transceivers that transceive communication data with mobile stations, such as the mobile station 12. More generally, the access points are representative of fixed-site communication stations that operate in conformity with a selected operating protocol to permit their communication of communication data with correspondingly configured mobile stations.

Each of the access points defines a coverage area, or cell. Here, a coverage area 18 is associated with the access point 14 and coverage area 22 is associated with the access point 16. Generally, a mobile station communicates with the access point in whose coverage area that the mobiles station is positioned. The coverage areas 18 and 22 are of partially overlapping coverage areas. As the mobile station travels, the mobile station passes through a coverage area defined by one of the access points and travels into the coverage area defined by another of the access points. As the mobile station travels out of the coverage area defined by a first of the access points, the mobile station becomes associated with the second of the access points. Here, for example, the mobile station 12 is initially positioned in the coverage area 18 defined by the access point 14. And, the mobile station travels in the direction indicated by the arrow 24, subsequently to be positioned in the coverage area 22 defined by the access point 16.

A communication transition is carried out so that the mobile station no longer communicates with the access point 14, but instead with the access point 16.

If the mobile station is involved in ongoing communications, i.e., a communication session is ongoing, the transition, i.e., handoff, of the communications with and by the mobile station must be carried out in a manner that minimizes degradation or interruption of the communications. As noted previously, existing manners by which transition are carried out require significant levels of overhead signaling that are time consuming and resource consumptive.

The access points include apparatus 32 of an embodiment of the present invention that facilitate the transition of communications between access points in manners, relative to conventional transition procedures, that are less resource-and time-consumptive. The elements of the apparatus are functionally represented, implementable in any desired manner.

The access points are connected by way of a network 34 in which the access points share a security association. That is to say, inter-access point signaling is secure. And, pursuant to operation of the apparatus 32, and its associated method, the transition is carried out with reduced signaling over the radio air interface through the use of a temporary pair-wise transient key (T-PTK) that is provided to the access point to which communications are to be transitioned and also to the mobile station. The temporary pair-wise transient key, once provided both to the access point and to the mobile station pursuant to communications subsequent to the transition. And, thereafter, a permanent key is created, and the temporary key is discarded.

The apparatus 32 includes a request message generator 38 that is adapted to receive an indication of a selection, here made at the mobile station, to transition communications to another access point. Here, the access point 14 is referred to as the old access point (oAP), and the access point 16 is referred to as the new access point (nAP). For purposes of explanation, the mobile station is initially in communication connectivity with the old access point 14 and selects that a transition be made to the new access point.

The request message generator 38 receives an indication, here indicated on the line 42, of the selection. The selection is made at the mobile station and reported to the old access point by way of a channel defined upon the radio air interface. Upon detection of the indication of the selection, the message generator generates a message for communication to the new access point by way of the network 34. The message that is generated includes a value of a temporary pair-wise transient key that is generated at the access point responsive to values communicated to the access point by the mobile station and also values originated at the access point. The apparatus 32 further includes a temporary key generator 44 that operates to generate the temporary key. Values generated at the mobile station and sent to the access point that are used by the temporary key generator are represented to be provided thereto by way of the line 42. And, the line 46 is representative of values originated at the access point that are used in the temporary key generation. Once generated, the temporary key is provided to the request message generator, here indicated by way of the line 48. And, the request message generator generates the request message that is forwarded on to the new access point by way of the network 34.

Once delivered to the new access point, the new access point defines a period of usability of the temporary key and reports back to the old access point acknowledgement of receipt of the temporary key and also, in the exemplary implementation, the period of usability of the temporary key.

The apparatus 32 further includes a response detector 54 that operates to detect the response generated by the new access point and returned to the old access point.

And, the apparatus 32 further includes a mobile station notifier 56. The mobile station notifier is also provided with the value of the temporary pair-wise transient key generated by the temporary key generator 44. The mobile station notifier operates to generate a notification message for communication, by way of the radio air interface to the mobile station.

The mobile station also includes apparatus 62 of an embodiment of the present invention. The apparatus 62 also is functionally represented, implementable in any desired manner, including implementations including algorithms executable by processing circuitry.

The apparatus 62 includes a notification detector 64 that operates to detect the notification message sent by the old access point to the mobile station. The detector detects, as part of the notification message, the temporary key contained therein. And, the apparatus also includes a reassociator 66 that operates to cause operation of the mobile station to transition to the new access point and to commence communications therewith utilizing the temporary key. Subsequent to initiation of the communications, the new access point and the mobile station form a permanent key, and subsequent communications are effectuated through the use of the permanent key.

Through operation of the apparatus of an embodiment of the present invention, signaling required over the radio air interface between the network part of the communication system and the mobile station is reduced as the temporary key, formed at the old access point is provided to the new access point by way of the network 34. Reduced signaling reduces the signaling overhead required pursuant to transition, or other hand-off, of communications form the old access point to the new access point, reducing the possibility that delays in communication transitions deleteriously effect the communication quality of communications between the mobile station and the network part or result in communication interruptions.

Figure 2:
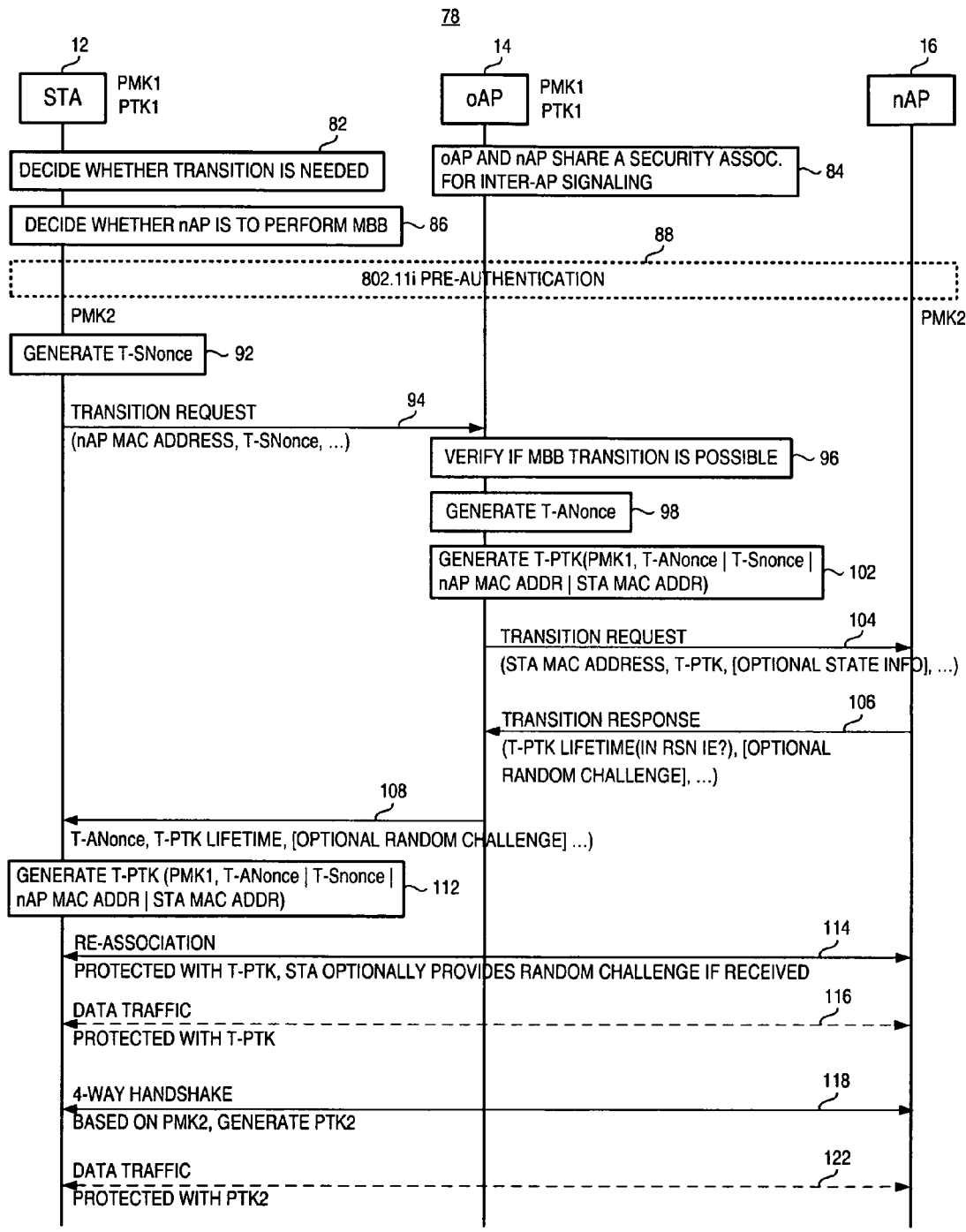
FIG. 2 illustrates a message sequence diagram, exemplary of signaling generated during exemplary operation of an embodiment of the present invention.

Turning next to FIG. 2, a message sequence, shown generally at 78, represents signaling generated during operation of the communication system 10, shown in FIG. 1, pursuant to an embodiment of the present invention. And, more particularly, signaling between the mobile station 12 and the access points 14 and 16, designated as oAP and nAP 14 and 16, respectfully, is shown. The message sequence is representative of signaling in an embodiment in which pre-authentication is carried out between the mobile station and the new access point.

Signaling represented in the figure commences with determination, noted at 82, by the mobile station that a transition from the old access point to a new access point is needed. And, as noted at 84, a security association is shared between the old and new access points 14 and 16, at least for the purposes of inter-access point signaling. Additionally, and as indicated at 86, the mobile station also selects that the communications are to be transitioned to the access point 16, rather than to another access point, pursuant to a make-before-break procedure.

The pre-authentication, which in the exemplary implementation, is carried out pursuant to the operating protocols of the IEEE 802.11i operating specification. The pre-authentication procedures are represented by the block 88.

Thereafter, and as indicated at 92, the mobile station generates a T-SNonce. And, as indicated by the segment 94, the mobile station generates a transition request that is sent to the old access point 14. The transition request includes the MAC address of the new access point, the T-SNonce, and other values.

Once delivered to the old access point, the access point operates to verify, as indicated at 96, that the make-before-break transition is possible, e.g., that it is an intra-ESS and the security association between the access points is in place. Then, and as indicated at 98, the access point generates a T-ANonce value. And, as indicated at 102, the access point 14 generates at temporary pair-wise transient key (T-PTK) having a PMK1 value, the value of the T-ANonce, magnitude of the T-Snonce value, the MAC address of the new access points 16, and the MAC address of the mobile station.

Thereafter, and as indicated by the segment 104, the access point 14 generates a transition request message to the access point 16. The transition request message includes, for instance, the MAC address of the mobile station, the T-PTK, and, optionally, additional information, such as state information. In one implementation, the transition request message is implemented as an IEEE 802.1X message. Once delivered to the access point 16, the access point 16 generates a transition response 106 that is returned, by way of the network 34 (shown in FIG. 1) to the access point 14. The transition response includes a T-PTK lifetime value, i.e., a value that indicates the period of usability of the temporary key. Optionally, a random challenge is also initiated, or performed, pursuant to the transition response.

The old access point also generates and sends, indicated by the segment 108, a notification message for delivery to the mobile station. The message includes the value of the T-ANonce, the T-PTK lifetime value as well as, optionally, a random challenge. Once delivered to the mobile station, the mobile station generates, indicated at 112, the T-PTK value using, at least in part, values provided to the mobile station in the notification message 108. The T-PTK values are thereby known both to the mobile station 12 and to the new access point 16.

Thereafter, reassociation is performed, indicated by the segment 114 in which the mobile station is placed in communication connectivity with the access point 16. The communications are protected with the T-PTK. And, in one implementation, the mobile station also provides a random challenge to the new access point.

Data traffic, indicated by the segment 116 thereafter is effectuated. The data traffic is protected with the T-PTK key. And, a four-way handshake is performed, indicated by the segment 118 that is based upon a PMK2 value and a second pair-wise transient key, PTK2, is generated. Subsequent data traffic, indicated by the segment 122, is effectuated through use of the newly-generated key.

Figure 3:
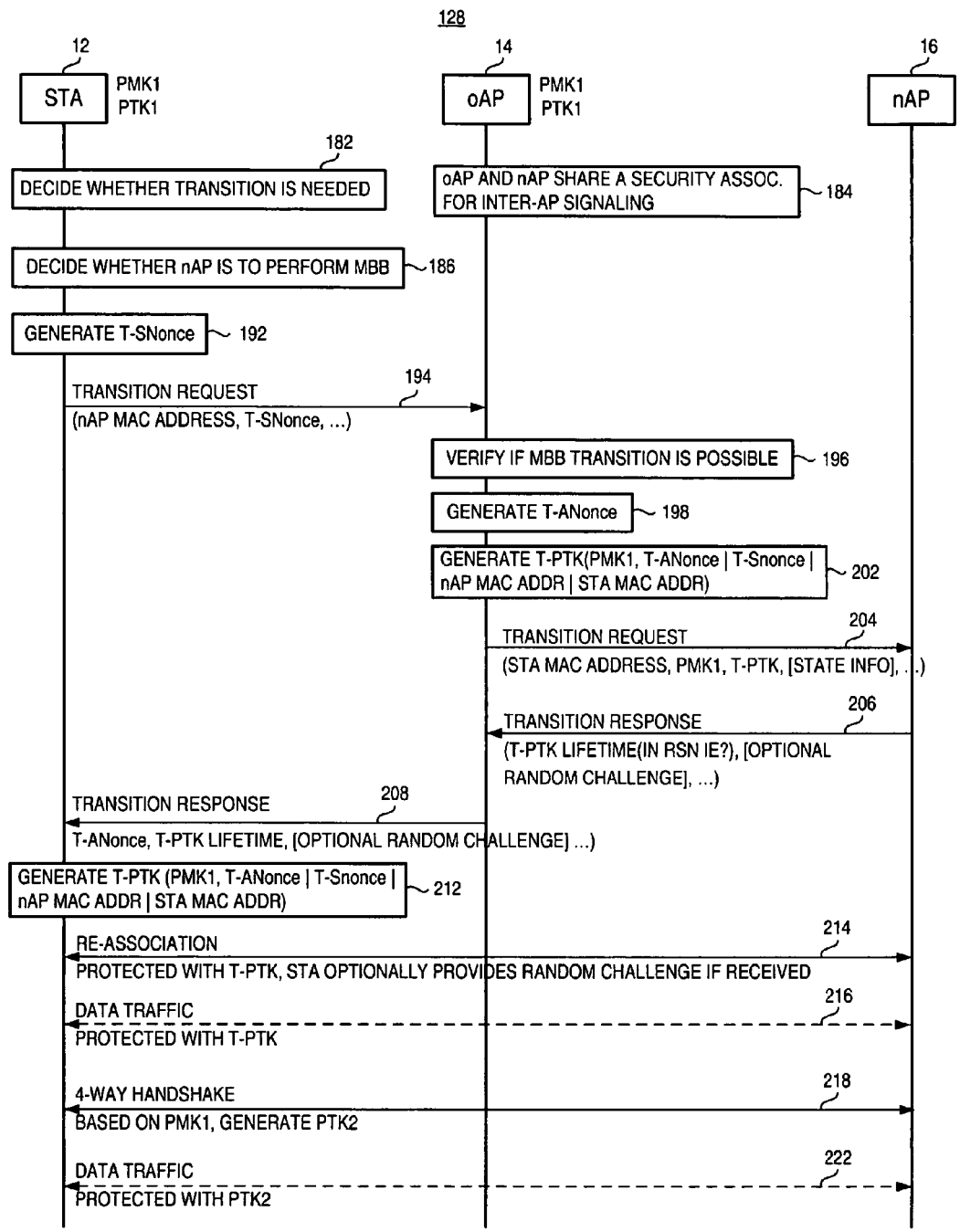
FIG. 3 also illustrates a message sequence diagram, representative of signaling generated pursuant to operation of an alternate embodiment of the present invention.

FIG. 3 illustrates another message sequence, shown generally at 128, also representative of signaling generated during operation of the communication system 10, shown in FIG. 1, pursuant to operation of an embodiment of the present invention. The sequence 128 also is representative of signaling generated pursuant to transition of communications from the old access point 14 to the new access point 16, here in which pre-authentication is not performed. The mobile station decides, indicated by the segment 182, that a transition is needed. And, the old and new access points 14 and 16 share, as indicated at 184, a security association for inter-access point signaling. Additionally, the mobile station selects the new access point 16 to perform the make-before-break transition, e.g., pursuant to an 11 k neighbor report, as indicated at 186.

The mobile station generates, indicated at 192, a value of a T-SNonce. And, as indicated by the segment 194, a transition request is generated and sent for delivery by way of the radio air interface to the old access point 14. The transition request includes the T-SNonce value and the MAC address of the new access point.

The old access point operates also to verify, shown at 196, that the MBB transition is possible, e.g., verifies that the transition is intra-ESS and that a security association between the access points is in place. And, the access point generates a value of T-ANonce, indicated at 198, and the access point generates a value of T-PTK, shown at 202.

The old access point then generates a transition request, indicated at 204, that is sent to the new access point by way of the network 34 (shown in FIG. 1). And, in response, the new access point 16 returns a transition response, indicated by the segment 206, to the old access point. A transition response includes the T-PTK lifetime, the period of usability of the temporary pair-wise transient key.

The old access point also sends a transition response, indicated by the segment 208, to the mobile station. And, the mobile station generates a temporary key, a temporary pair-wise transient key, as shown at 212.

Thereafter, and as indicated by the segment 214, the mobile station re-associates with the new access point. Communications are protected with the temporary key. Other operations, such as a random challenge, are analogous to those described with respect to segment 114 shown in FIG. 2. Subsequent to re-association, data traffic communication is effectuated, indicated by the segment 216. The data traffic is protected by the use of the temporary key. Thereafter, and as indicated by the segment 218, a four-way handshake is performed and a new key, indicated at a second pair-wise transient key, is generated. And, subsequent data traffic, indicated by the segment 222, is protected with the second key.

Figure 4:
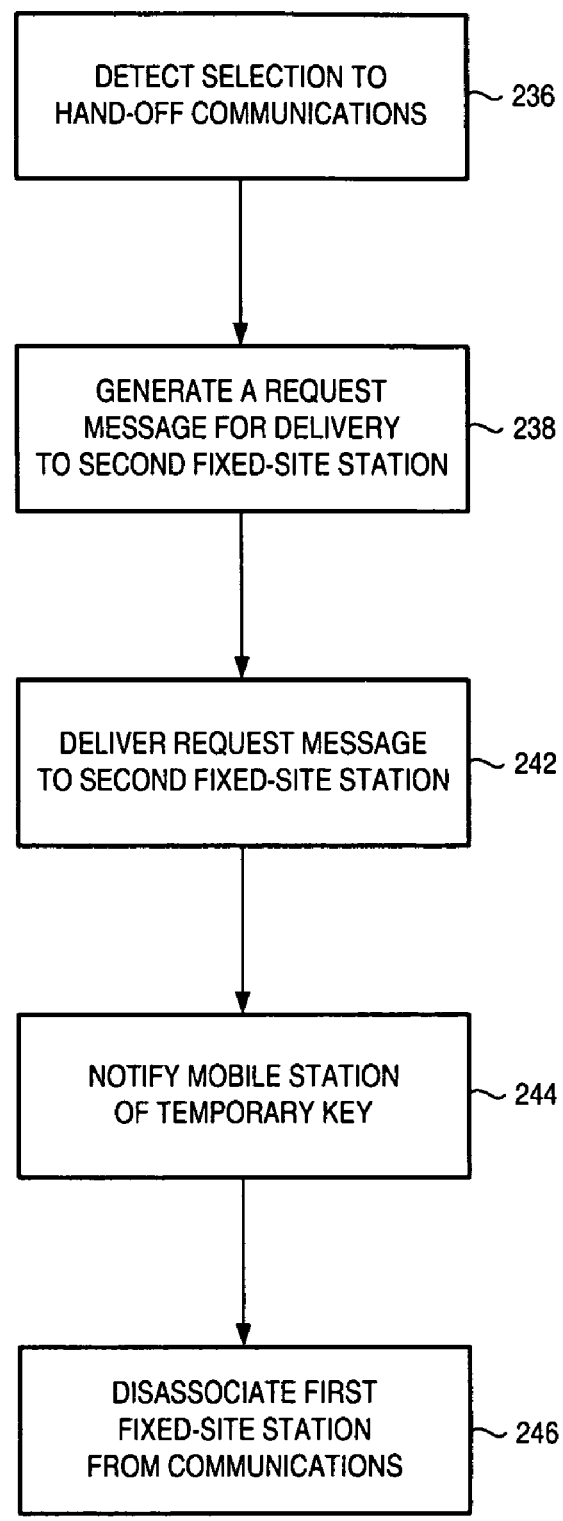
FIG. 4 illustrates a method flow diagram listing the method of operation of an embodiment of the present invention.

FIG. 4 illustrates a method, shown generally at 234, of an embodiment of the present invention. The method facilitates hand-off of communications of a mobile station with a first fixed-site station.

First, and as indicated by the block 236, selection to hand-off communications from the first fixed site station to a second fixed-site station is detected. Then, and as indicated by the block 238, a request is generated for delivery to the second fixed-site station. The request requests hand-off of the communications. The request includes a temporary key generated and used pursuant to communications between the mobile station and the first fixed-site station. And, as indicated by the block 242, the request is delivered to the second fixed-site station.

Thereafter, and as indicated by the block 244, the mobile station is notified of the temporary key. And, as indicated by the block 246, the first fixed-site station is disassociated out of the communications pursuant to the hand-off to the second fixed-site station.

Reduced signaling overhead on the radio air interface and the correspondingly reduced amount of time required by which to perform signaling required pursuant to a transition of communications to a new access point advantageously reduces the possibility of service interruption or degradation during the transition.

The previous descriptions are of preferred examples for implementing the invention, and the scope of the invention should not necessarily be limited by this description. The scope of the present invention is defined by the following claims.

What is claimed is:

1. A method for facilitating hand-off of communications of a mobile station, comprising:
    determining that the mobile station is to transition from a first fixed-site station to a second fixed-site station;
    in response to the determining that the mobile station is to transition to the second fixed-site station, generating a first random string and sending a transition request to the first fixed-site station to be forwarded to the second fixed-site station, the transition request comprising information concerning the second fixed-site station and the first random string;
    receiving from the first fixed-site station a transition response which was initiated by the second fixed-site station, the transition response comprising security-related parameters usable by the mobile station to derive a security key and to reassociate with the second fixed-site station;
    deriving the security key based on the security-related parameters and the first random string; and
    reassociating with the second-fixed site station comprising the security-related parameters contained within the transition response.

2. The method of claim 1, wherein the first fixed-site station further provides information to the second fixed-site station for use in the reassociation.

3. The method of claim 1, further comprising disassociating with the first fixed-site station.

4. The method of claim 1, wherein the security-related parameters include information relating to a temporary key.

5. The method of claim 4, wherein the temporary key includes a selected period of usefulness.

6. The method of claim 1, wherein the procedure comprises a handshake procedure.

7. An apparatus configured to:
    determine that the apparatus is to transition from a first fixed-site station to a second fixed-site station;
    in response to the determining that the apparatus is to transition to the second fixed-site station, generate a first random string and send a transition request to the first fixed-site station to be forwarded to the second fixed-site station, the transition request comprising information concerning the second fixed-site station;
    receive from the first fixed-site station a transition response which was initiated by the second fixed-site station, the transition response comprising security-related parameters usable by the apparatus to derive a security key and to reassociate with the second fixed-site station;
    derive the security key based on the security-related parameters and the first random string; and
    reassociate with the second-fixed site station comprising the security-related parameters contained within the transition response.

8. The apparatus of claim 7, wherein the first fixed-site station further provides information to the second fixed-site station for use in the reassociation.

9. The apparatus of claim 7, wherein the apparatus is further configured to disassociate with the first fixed-site station.

10. The apparatus of claim 7, wherein the security-related parameters include information relating to a temporary key.

11. The apparatus of claim 10, wherein the temporary key includes a selected period of usefulness.

12. The apparatus of claim 7, wherein the procedure comprises a handshake procedure.

13. A method for facilitating hand-off of communications of a mobile station, comprising:
    receiving a transition request from the mobile station, the transition request comprising information concerning a second fixed-site station to which communications are to be transitioned and a generated first random string, the transition request having been generated in response to a determination that the mobile station is to transition to the second fixed-site station;

in response to the received transition request, forwarding the received transition request to the second fixed-site station;

receiving from the second fixed-site station a transition response, the transition response comprising security-related parameters; and in response to the received transition response, forwarding the transition response to the mobile station, wherein the security-related parameters and the first random string are usable by the mobile station to derive a security key, and wherein the security key is usable by the mobile station to reassociate with the second fixed-site station.

14. The method of claim 13, wherein the security-related parameters include information relating to a temporary key.

15. The method of claim 14, wherein the temporary key includes a selected period of usefulness.

16. The method of claim 13, wherein the procedure comprises a handshake procedure.

17. An apparatus configured to receive a transition request from the mobile station, the transition request comprising information concerning a second fixed-site station to which communications are to be transitioned and a generated first random string, the transition request having been generated in response to a determination that the mobile station is to transition to the second fixed-site station;

in response to the received transition request, forward the received transition request to the second fixed-site station;

receive from the second fixed-site station a transition response, the transition response comprising security-related parameters; and in response to the received transition response, forward the transition response to the mobile station, wherein the security-related parameters and the first random string are usable by the mobile station to derive a security key, and wherein the security key is usable by the mobile station to reassociate with the second fixed-site station.

18. The apparatus of claim 17, wherein the security-related parameters include information relating to a temporary key.

19. The apparatus of claim 18, wherein the temporary key includes a selected period of usefulness.

20. The apparatus of claim 17, wherein the procedure comprises a handshake procedure.

* * * * *